United States Patent [19]

Huddleston, deceased et al.

[11] Patent Number: 4,924,573

[45] Date of Patent: May 15, 1990

[54] PRUNER WITH POWER DRIVEN EXTENSION

[76] Inventors: Earl M. Huddleston, deceased, late of Las Vegas; by Anne W. Huddleston, executrix, 9029 Cypress Point Way, Las Vegas, both of Nev. 89117

[21] Appl. No.: 323,809

[22] Filed: Mar. 15, 1989

[51] Int. Cl.⁵ .......................... A01G 3/08; B27B 17/02
[52] U.S. Cl. ...................................... 30/272.1; 30/276; 30/296.1; 30/383
[58] Field of Search ...................... 30/296 R, 383, 379, 30/379.5, 245, 285, 249, 210, 216, 378; 74/89.15, 378

[56] References Cited

U.S. PATENT DOCUMENTS

| | | | |
|---|---|---|---|
| 1,364,432 | 1/1921 | Georgelis | 30/379.5 |
| 1,858,015 | 5/1932 | Hodgson | 30/379 |
| 2,462,314 | 2/1949 | Fuqua | 30/379 X |
| 2,777,483 | 1/1957 | Cheren | 30/372 |
| 4,207,675 | 6/1980 | Causey et al. | 30/296 R |
| 4,347,880 | 9/1982 | van der Merwe | 30/296 R |
| 4,654,471 | 4/1987 | Fettes et al. | 30/296 R |
| 4,733,471 | 3/1988 | Rahe | 30/296 R |

Primary Examiner—Frank T. Yost
Assistant Examiner—Rinaldi Rada
Attorney, Agent, or Firm—Paul F. Horton

[57] ABSTRACT

An improved pruner having a housing assembly provided with telescoping sections, a telescoping drive shaft assembly contained within the housing, a cutting head at one of the drive shaft assembly, and a power source at the other end and further including, as an improvement, a power driven gear system including reduction gears and reversing gears, and a worm drive engaging a rack mounted upon the telescoping sections of the housing for extending or collapsing the housing and hence the pruner. A shift lever adjacent a pruner handle actuates the worm drive to extend or collapse the pruner to provide a pruner of desired length.

4 Claims, 2 Drawing Sheets

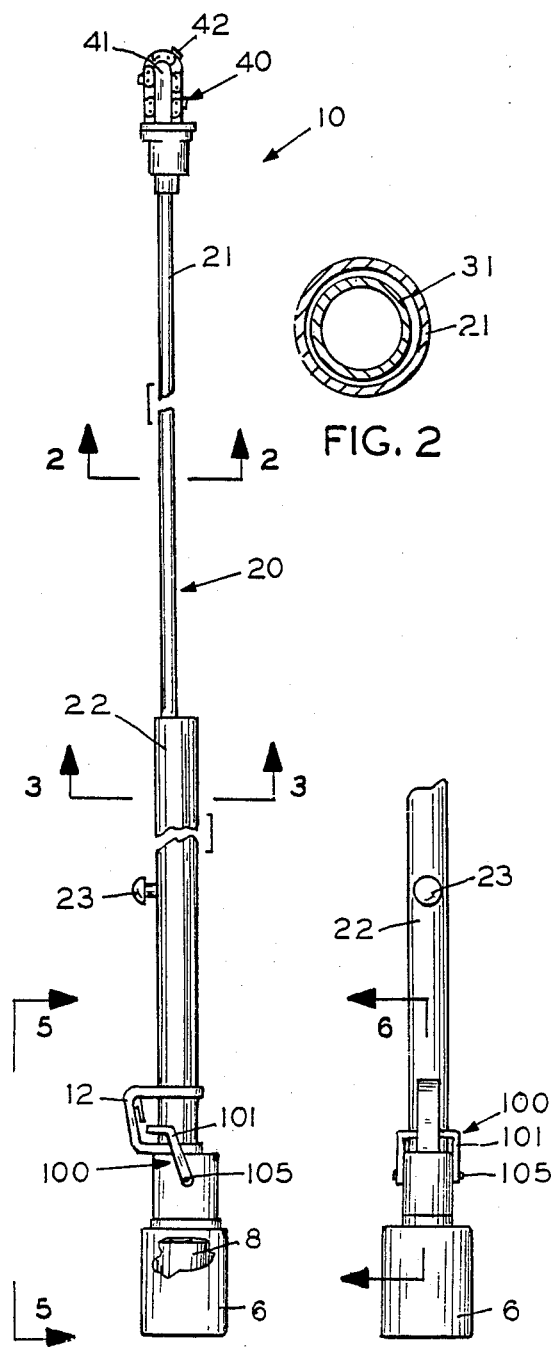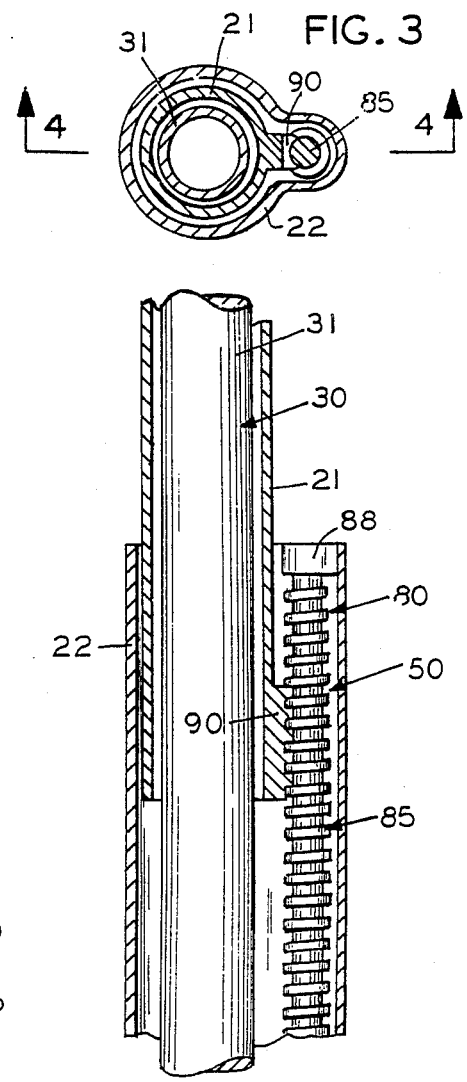

PRUNER WITH POWER DRIVEN EXTENSION

BACKGROUND OF THE INVENTION

1. Field of the Invention

This invention relates to portable, collapsible pruners and, more particularly, to pruners having telescoping housing sections and a telescoping drive shaft which are extended to a desired length by an existing power source.

2. Description of the Prior Art

A recent invention by I. Fettes et al, as described and claimed in U.S. Pat. No. 4,654,971, provides a pruner which is extendible to facilitated the pruning of hard to reach trees, shrubs, and the like, but yet is collapsible for compact storage. Telescoping housing and drive shaft sections, held in place by manually tightened compression clamps, enable the device to be extended to a desired length.

While being a marked improvment over other pruners, the pruner of Fettes et al, for extension or collapsing, must be stopped, compression clamps loosened, the housing sections either extended or collapsed, clamps retightened, and the pruner started again for operation. Such procedure is obviously cumbersome and time consuming.

SUMMARY OF THE INVENTION

The improved pruner of the present invention overcomes these problems and provides a pruner which may be extended; collapsed; or held at a desired length during operation. Structure providing this novel function includes a power driven extension means and control means which utilize the existing power source to move the telescoping housing sections and hence the telescoping drive shaft sections in a selected direction for extending or shortening the length of the pruner and which holds the pruner at a given extension without starting or stopping the pruner.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a side elevation of an improved pruner made according to the present invention.

FIG. 2 is a cross sectional view taken along lines 2—2 of FIG. 1.

FIG. 3 is a cross sectional view taken along lines 3—3 of FIG. 1.

FIG. 4 is a side sectional view taken along lines 4—4 of FIG. 3.

FIG. 5 is a side elevational view taken along lines 5—5 of FIG. 1.

DETAILED DESCRIPTION OF THE INVENTION

Figure 6:
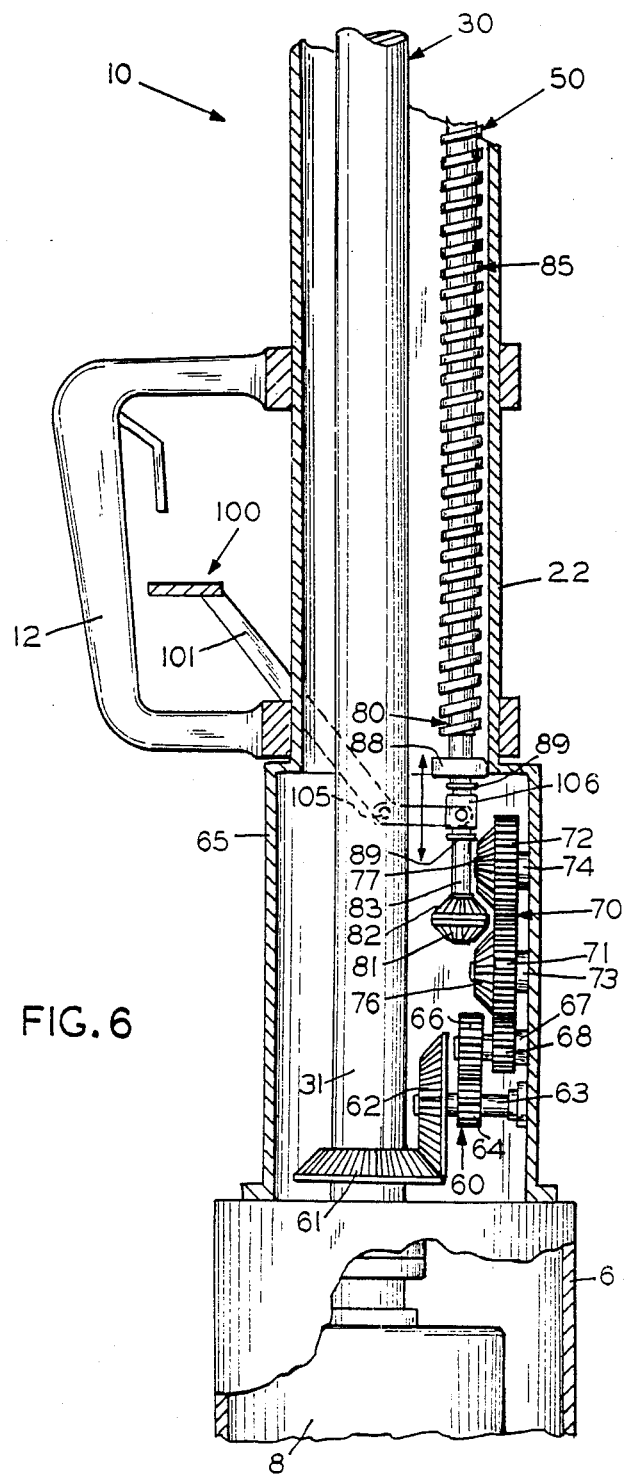
FIG. 6 is a side sectional view taken along lines 6—6 of FIG. 5.

Referring now to the drawings, an embodiment to be preferred of an improved pruner 10, made according to the present invention is disclosed. Improver pruner 10 includes, generally, a drive shaft housing assembly 20; a drive shaft assembly 30; a cutting assembly 40; a power source 8; power driven extension means 50; and control means 100.

The drive shaft housing assembly, drive shaft assembly, cutting assembly, and power source are, with a few important exceptions, which will be explained in detail, shown in U.S. Pat. No. 4,654,971, assigned to Hudd Enterprises, and therefore a general description of these units will suffice.

Drive shaft housing assembly 20 includes at least one hollow, tubular, section 21 which telescopically engages fixed lower housing section 22, and which may telescopically engage other sections, not shown. Lower section 22 may be provided with a knob or handle 23 for grasping with one hand while the other hand grasps handle 12.

Contained within housing assembly 20 is drive shaft assembly 30 which is provided with a selected number of hollow, tubular drive shaft sections 31, which also telescopically engage one another. A tongue and groove structure or dimple and groove structure, not shown, on both housing and shaft sections, prevents rotation of the respective sections relative to one another. Suitable bushings prevent contact between the drive shaft sections and the housing sections. At one end, the drive shaft assembly is connected to power source 8 and at the other end the assembly is connected to cutter 42 which is preferably in the form of a cutting chain held on a cutting bar 41, as is conventional. Power source 8 is preferably in the form of an electric motor or gasoline engine.

Referring now to FIGS. 3, 4, and 5, in particular, the improvement of the present invention are shown to advantage. Power drive extension means, designated generally by the numeral 50, includes a reduction gear assembly 60, a reversible gear assembly 70, a worm-gear assembly 80 and a rack 90.

Power for driving the extension means is taken off the lowermost drive shaft section 31 adjacent power source 8 by means of a first bevel gear 61, affixed to drive shaft section 31. Gear 61 meshes with a second bevel gear 62 set at right angles to the first gear. Second gear 62 is coupled to a first spur gear 64 by means of axle 63 and spur gear 64 may mesh with a second spur gear 66 coupled to yet a third spur gear 68 by axle 67. The spur gears and bevel gears are of appropriate diameter and mesh to bring about the desired ratio of gear reduction.

Meshing with spur gear 68, in the embodiment shown, is first reversing gear 71 which, in turn, meshes with a second reversing gear 72 to that the gears rotate in an aligned but reversed direction. First reversing gear 71 is carried by axle 73 which also carries an adjacent bevel gear 76 and second reversing gear 72 is carried by axle 74, also carrying bevel gear 77. Bevel gears 76 and 77 are aligned with one another in a vertically spaced relationship. Interposed between bevel gears 76 and 77, in a back to back relationship, are bevel gears 81 and 82 mounted on a shaft 83. Shaft 83 slidingly engages, as by a key and slot arrangement, not shown, worm drive shaft 85. The reduction gear assembly and reversible gear assembly are mounted in gear housing 65 between motor housing 6 and lower drive shaft housing 22.

Control means 100, includes a shift lever 101 pivotally engaging housing 65 by means of a pivot pin 105. The exterior free end of the shift lever is located within the confines of handle 12 for convenience and to prevent accidental engagement. The opposing end of lever 101 pivotally engages a shaft sleeve 106 mounted on shaft 83 between shaft flanges 89 by appropriate bearings for raising or lowering the shaft. Lever 101 is preferably spring loaded to return to a neutral position. In the neutral position, bevel gears 81 and 82 are not in contact with either bevel gear 76 or 77. It will be seen, however, that as the free end of lever 104 is raised that shaft 83 is lowered to bring bevel gear 81 into meshing engagement with bevel gear 76 to cause shaft 83 and hence worm drive shaft 85 to rotate in a particular direction, while, if the lever is lowered, shaft 83 is raised to bring bevel gear 82 into meshing engagement with bevel gear 77 to cause shaft 83 and hence worm drive shaft 85 to rotate in an opposite direction.

Worm drive shaft 85, mounted for rotation within lower housing section 22 by suitable bearings 88, meshes with rack 90, which is provided with mating helical teeth. The rack is mounted to telescoping section 21 of housing assembly 20 so as to move therewith. It will be seen, then, that as worm drive shaft 85 is rotated in one direction, section 21 will be lifted or extended relative to lower section 22 and, to the contrary, where shaft 85 is rotated in the opposing direction, section 21 will be lowered or collapsed.

Having thus described in detail a preferred embodiment of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. An improved pruner of the type having a telescoping drive shaft housing assembly, a rotatable telescoping drive shaft assembly contained within the housing assembly, cutting means interconnected at one end of the drive shaft assembly, and a power source interconnected at the other end of the drive shaft assembly, wherein said improvement comprises:

power driven extension means including a first bevel gear affixed to the drive shaft assembly adjacent the power source; a second bevel gear meshing with said first bevel gear; at least one reduction gear interconnected to said second bevel gear; a pair of reversing gears meshing with one another and one of said reversing gears meshing with said reduction gear; an elongated worm drive shaft interconnectible with a selected reversing gear; and a rack affixed to said drive shaft housing assembly and meshing with said worm drive shaft for reciprocal movement of at least a portion of said housing assembly; and control means including a shift lever operable to connect said worm drive shaft to a selected reversing gear for extending or shortening the pruner and said shift lever operable to disengage from said reversing gears for holding the pruner at a set position.

2. An improved pruner of the type having a telescoping drive shaft housing assembly, a rotatable telescoping drive shaft assembly contained within the housing assembly, cutting means interconnected at one end of the drive shaft assembly, and a power source interconnected at the other end of the drive shaft assembly, wherein said improvement comprises:

power driven extension means interconnected between said power source and said housing assembly for telescopically extending or contracting the pruner, said extension means including a reduction gear assembly interconnected to said power source; a worm gear assembly interconnected with said reduction gear assembly, and a rack interconnected to said worm gear assembly and said drive shaft housing assembly for reciprocal movement therewith; and control means for selected activation of said extension means.

3. The pruner as described in claim 1 wherein said extension means further comprises a reversible gear assembly interconnected between said reduction gear assembly and said worm gear assembly.

4. The pruner as described in claim 3 wherein said control means includes a shift lever for selective engagement and disengagement with said reversible gear assembly for moving said drive shaft housing assembly in a selected direction and for holding said assembly at a fixed position.

* * * * *